(No Model.)

A. STONER.
ROTARY LINE MEASURE.

No. 361,791. Patented Apr. 26, 1887.

Witnesses
Chas. H. Smith
J. Staib

Inventor.
Augustus Stoner.
per Lemuel W. Serrell
atty

UNITED STATES PATENT OFFICE.

AUGUSTUS STONER, OF NEW YORK, N. Y.

ROTARY LINE-MEASURE.

SPECIFICATION forming part of Letters Patent No. 361,791, dated April 26, 1887.

Application filed October 6, 1886. Serial No. 215,432. (No model.)

*To all whom it may concern:*

Be it known that I, AUGUSTUS STONER, of the city and State of New York, have invented an Improvement in Lineameters, of which the following is a specification.

Before my invention measuring-instruments had been made containing a disk with the inches or other measures around its periphery, so that said disk when rolled over the surface measures the distance between any two points. Counting-wheels have also been combined with the measuring-disk, so as to indicate the number of revolutions and the total distance traveled by the measuring-disk. Lineameters of this character are not adapted to general use on account of the expense of construction and the space occupied by the apparatus.

My present improvements are for simplifying and cheapening the lineameter, so that the same will be easily carried in the pocket and be adapted to taking the place of an ordinary measuring-rod.

I employ a circular measure with the divisions upon the face thereof at the periphery, and two grasping-plates connected with the axis of the disk, so that the measuring-disk can be held between the thumb and finger as they rest upon the grasping-plates, and the disk can be placed upon the article to be measured, with the zero at the point where the measurement is to commence, and rolled along the surface to the distant stopping-point. The number of revolutions of the measuring-disk is determined by observation or by a projection that comes into contact with the thumb or finger every rotation of the measuring-disk.

Figure 1:
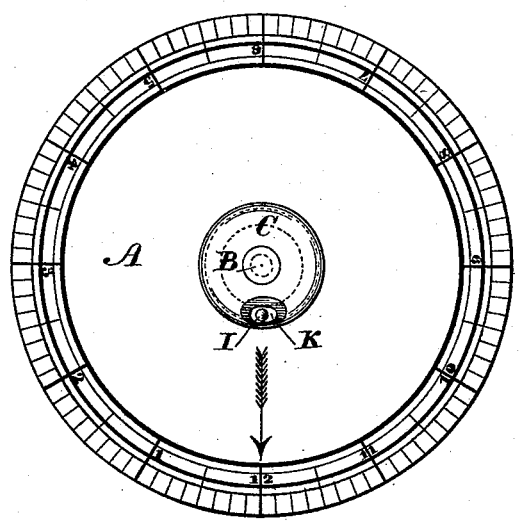
Figure 2:
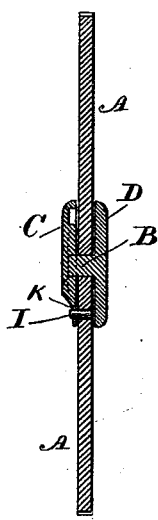
Figure 3:
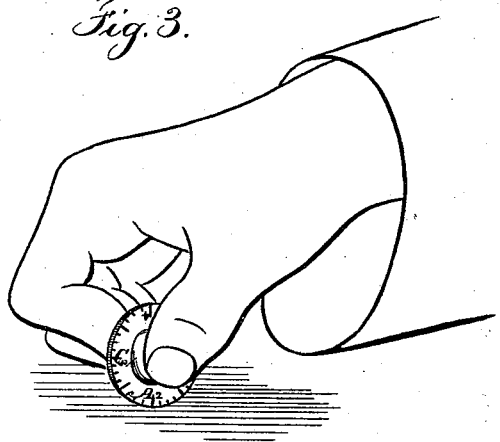

In the drawings, Figure 1 is an elevation of the lineameter. Fig. 2 is a central section, and Fig. 3 is an edge view illustrating the manner in which the lineameter is held when in use. Figs. 1 and 2 are in magnified size for greater clearness.

The measuring-disk A is of such a size that its periphery will measure four, six, or eight inches, or other desired distances, and upon one face of the disk the divisions and subdivisions are carefully marked by radial lines.

There is an axis, B, passing freely through a central hole in the measuring-disk, and the grasping-plates C and D are upon the ends of the axis. They are sufficiently large for the finger and thumb, so that the plates can be grasped firmly without the finger or thumb coming into contact with the measuring-disk, and these disks are preferably fastened to the axle; but under all circumstances the measuring-disk is free to be rotated between the grasping-plates.

The zero-point should be distinctly marked upon the face of the disk, so that the division at this point may be made to correspond with the starting-point of the measurement, and the number of revolutions given to the measuring-disk in measuring long distances can be counted by observing the zero-point; but usually it is preferable to provide a pin, I, or projection of suitable kind upon one face of the measuring-disk near one of the grasping-plates, so that this projection may come in contact with the finger, each revolution and the number of revolutions of the measuring-disk be counted, and I prefer to turn in the back of one of the grasping-plates an annular recess amply large enough for the passage of the pin I, and to provide an opening at K, into which the flesh of the finger or thumb may be pressed as the instrument is grasped, so that the pin will touch such finger or thumb each revolution, for indicating the number of times that the peripheral measure is to be multiplied to denote the entire distance traveled by the lineameter.

The edge of the measuring-wheel is preferably milled like a coin.

I do not claim a two-part disk forming a protractor and lineameter, nor the central grasping-plates combined therewith, nor a pin upon the grasping-disk, as these have been used; but the friction of the grasping-disks when they turn between the fingers is liable to cause the measuring-disk to slip.

I claim as my invention—

1. The combination, with a measuring-disk having peripheral divisions, of an axis for the same, grasping-disks, one on each side of the measuring-disk and attached to the axis, and a projection upon the measuring-disk to come into contact with the thumb or finger once each revolution of the measuring-disk, substantially as set forth.

2. The combination, with the measuring-disk having peripheral divisions, of an axis passing through the central hole in the disk, grasping-plates at the ends of the axis, one of which has an opening through the same, and a stud or projection upon the measuring-disk to come into contact with the portion of the thumb or finger that projects into the said opening, substantially as set forth.

Signed by me this 30th day of September, A. D. 1886.

AUG. STONER.

Witnesses:
GEO. T. PINCKNEY,
WALLACE L. SERRELL.